United States Patent [19]

Schlyter

[11] 4,363,121

[45] Dec. 7, 1982

[54] METHOD AND SYSTEM FOR SIMULTANEOUS BIDIRECTIONAL TRANSMISSION OF INFORMATION

[75] Inventor: Fredrik Schlyter, Fairfield, Conn.

[73] Assignee: DuArt Film Laboratories, New York, N.Y.

[21] Appl. No.: 94,296

[22] Filed: Nov. 14, 1979

[51] Int. Cl.³ .............................................. H04L 5/14
[52] U.S. Cl. ......................................... 370/24; 370/11
[58] Field of Search ...................... 370/24, 31, 32, 11; 179/170 NC

[56] References Cited

U.S. PATENT DOCUMENTS

| | | | |
|---|---|---|---|
| 3,573,370 | 4/1971 | Blauert et al. | 370/24 |
| 3,758,719 | 9/1973 | Klose | 370/78 |
| 3,943,284 | 3/1976 | Nelson | 370/24 |
| 3,970,784 | 7/1976 | Meijerink | 370/31 |
| 4,178,504 | 12/1979 | Farmer | 370/31 |

FOREIGN PATENT DOCUMENTS 2243519  3/1974  Fed. Rep. of Germany ........ 370/31

Primary Examiner—Douglas W. Olms
Attorney, Agent, or Firm—Eric Y. Munson

[57] ABSTRACT

A system is provided for the simultaneous transmission of two asynchronous base-band logic information signals in opposite directions between first and second information stations using only a single pair of transmission wires, while maintaining electrical isolation between said information stations. The first information station includes a voltage source for driving the transmission line. The source voltage is constant in magnitude but its polarity is determined by the state of the signal being applied to the logic input port of the first information station. The second information station includes circuitry that responds to the polarity of the transmission line voltage and controls the logic output port of the second information station through a photocoupler. The second information station also includes a current sink controlled through a photocoupler by the signal applied to the logic input port of the second information station. The current sink controls the magnitude of transmission line current, which after sensing by circuitry included in the first information station, controls the logic output port of the first information station.

15 Claims, 4 Drawing Figures

METHOD AND SYSTEM FOR SIMULTANEOUS BIDIRECTIONAL TRANSMISSION OF INFORMATION

BACKGROUND OF THE INVENTION

The present invention relates to a transformerless system for simultaneously transmitting logic information signals independently and bidirectionally between first and second information stations using only a single pair of transmission wires, while maintaining electrical isolation between said information stations. The system can be advantageously used for example to interconnect two computers, a computer and a keyboard and the like.

Although systems for bidirectional transmission of information on a single pair of wires are known to the art, each of these known systems has certain drawbacks. For example, some known systems require carrier modulation with transformer coupling to achieve common-mode isolation. Other known systems require a floating power supply or are incapable of simultaneous asynchronous transmission.

It is not believed that the known art provides a system in which a logic signal is transmitted through a photocoupler from a first to a second information station in the form of a voltage signal on a transmission line, while simultaneously another logic signal is transmitted through a photocoupler in the reverse direction in the form of a current signal on said transmission line. It is the object of the present invention to provide such a simultaneous, bidirectional transmission system.

SUMMARY OF THE INVENTION

A system is provided for bidirectional, simultaneous transmission of information from a first to a second information station through a single pair of transmission wires. The first information station includes means responsive to the logic state of a first binary logic signal for generating a polarity signal which is transmitted through the transmission wires to the second information station. A receiver in the second information station includes a first photocoupler which is responsive to the polarity signal to provide an output signal at the second information station.

The second information station further includes a transmitter having a second photocoupler which is responsive to the logic state of a second binary logic signal applied to the transmitter. The second photocoupler is coupled to the first information station through the transmission wires. Depending on the logic state of the second binary logic signal, the second photocoupler will either draw or not draw a current from the first information station through the transmission wires. Means within the first information station are provided to detect a current drawn by the transmitter and provide a signal at the first information station in response thereto.

DESCRIPTION OF THE PREFERRED EMBODIMENT

Figure 1:
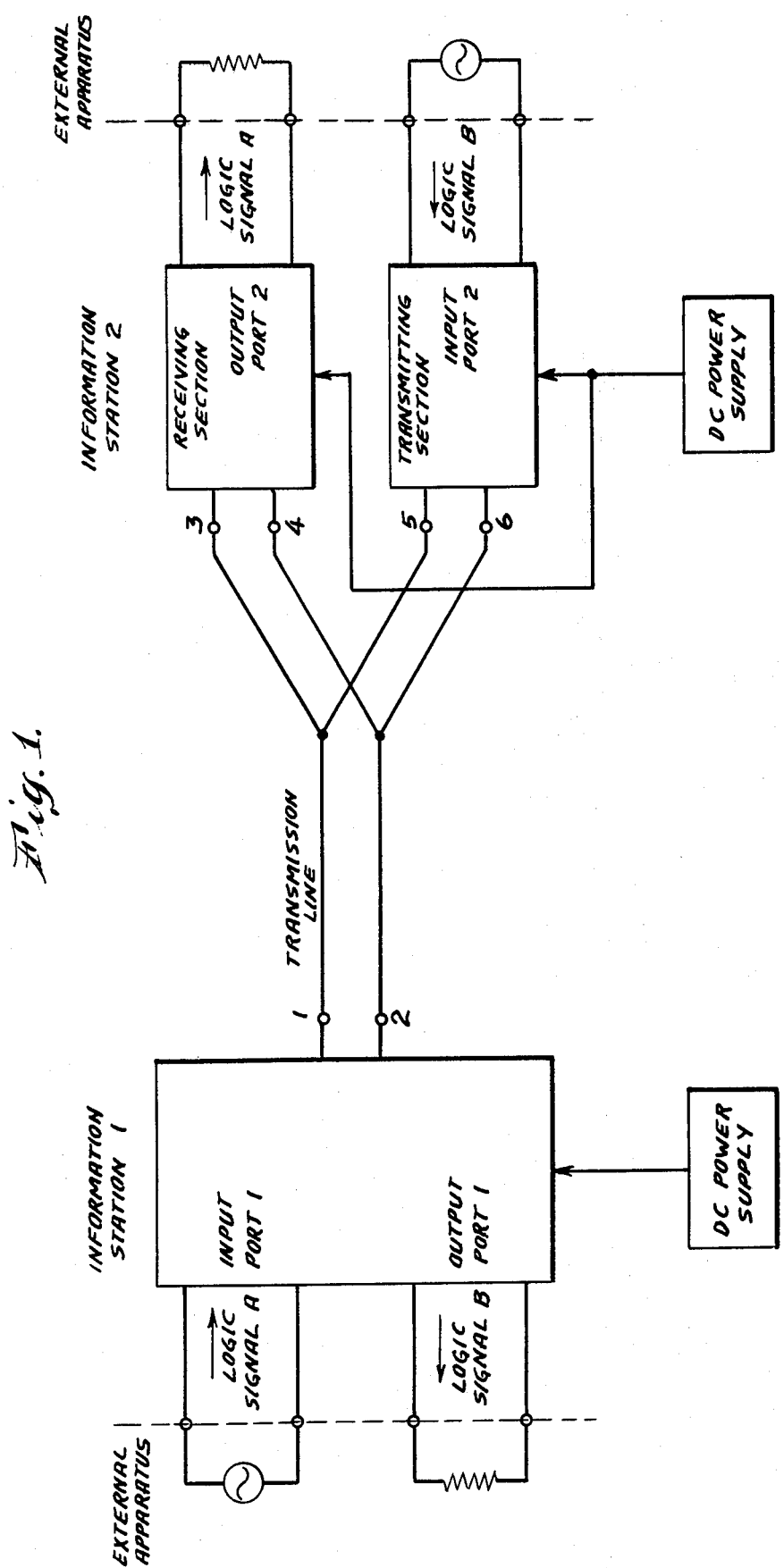
FIG. 1 illustrates the basic concepts of the present invention.

Before discussing the detailed schematics it will be helpful to describe the basic concepts of the present invention with reference to FIG. 1. In the following it is assumed that logic signals A and B change state slowly compared to the propagation time of the transmission line. In other words, it is assumed that the voltage and current are uniform along the line. Furthermore, resistive drops and leakages are ignored. Since independent logic signals A and B appear simultaneously on the transmission line, there are four possible line conditions. In the present invention, these four states are produced by letting the transmission line voltage assume one of two values, $+V$ and $-V$, and letting the transmission line current magnitude assume one of two values, NI and I. Actual voltage and current values may be optimized for different applications, with V equal to 6.8 volts, NI equal to 60 milliamperes and I equal to 20 milliamperes being typical.

Logic signal A controls a voltage source in information station 1 such that $+V$ or $-V$ is applied to line terminal 1 with respect to line terminal 2 if A is asserted or negated, respectively. At information station 2, transmission line terminals 3 and 4 drive a receiving circuit which asserts output port 2 if the line polarity is positive and otherwise negates said output port.

Logic signal B controls a current sink in information station 2 such that the magnitude of current flowing in the transmission line is NI or I if B is asserted or negated, respectively. The direction of current flow depends on the state of logic signal A and does not affect the transmission of logic signal B. A receiving circuit in information station 1 senses the magnitude of the transmission line current and asserts or negates output port 1 if the current is greater than or less than a reference value, respectively. The current reference value may be set half-way between NI and I, or lower to compensate for line losses.

DESCRIPTION OF FIRST INFORMATION STATION EMBODIMENT

Figure 2:
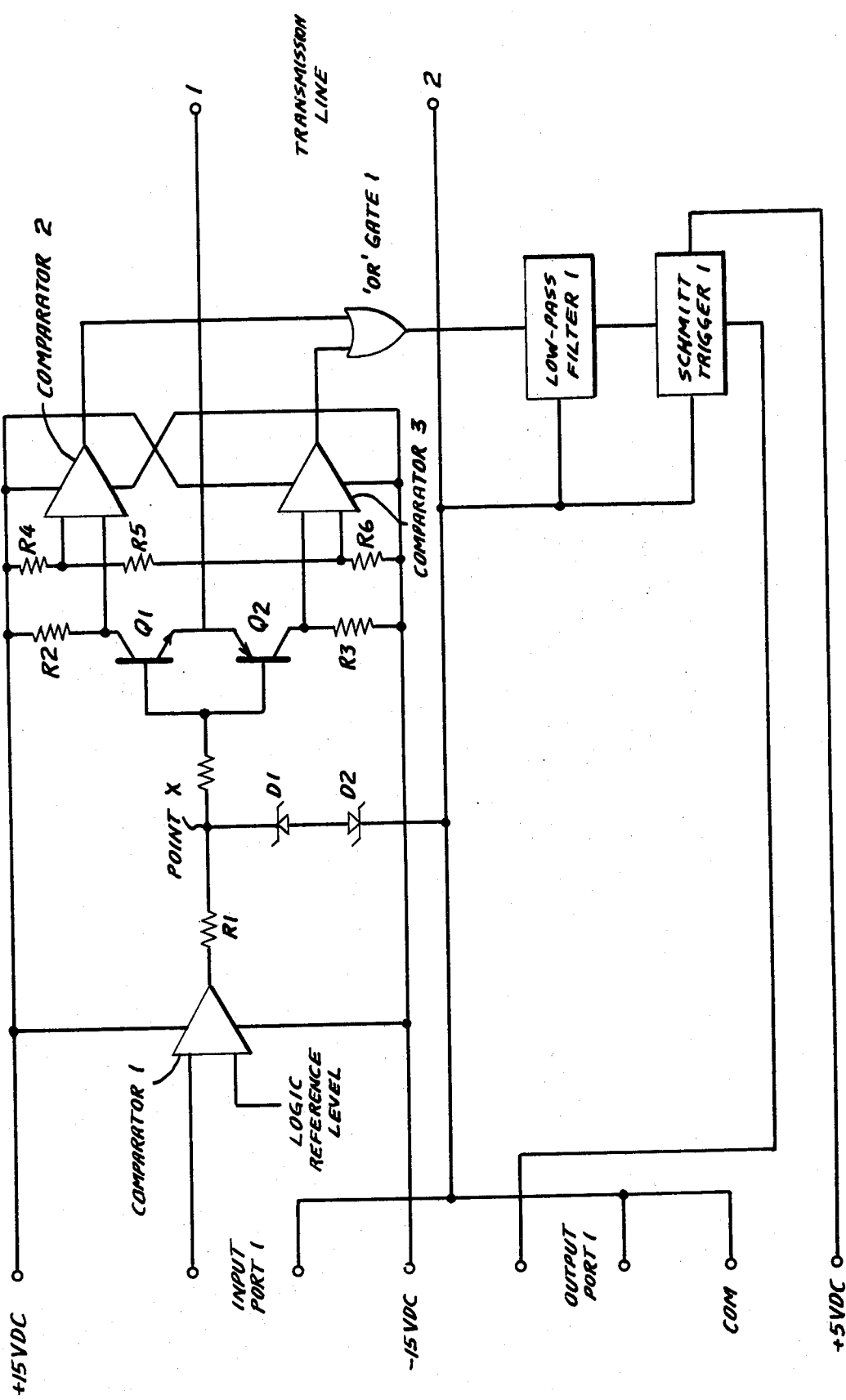
FIG. 2 illustrates one embodiment of information station 1 of FIG. 1.

Referring to FIG. 2, the first information station can be functionally divided into a transmitting circuit and a receiving circuit. The transmitting circuit comprises comparator 1, resistor R1, zener diodes D1 and D2 and transistors Q1 and Q2. The receiving circuit comprises resistors R2 through R6, comparators 2 and 3, "OR"-gate 1, low-pass filter 1 and schmitt-trigger 1.

The purpose of the transmitting circuit is to drive the transmission line to $+V$ or $-V$ if input port 1 is asserted or negated, respectively, regardless of the current drawn by the transmission line. This requires a low driving impedance, which is provided by complementary emitter followers Q1 and Q2, while the voltage swing is defined by a clamping circuit comprising zener diodes D1 and D2 and resistor R1.

In the following discussion of the transmitter circuit operation, diode forward voltage drops and transistor base-emitter forward voltage drops will be ignored since they are relatively small and also tend to cancel each other out. It will also be assumed that D1 and D2 have zener breakdown voltages equal to V.

If input port 1 is asserted, the voltage at point X will equal $+V$, causing Q1 to conduct, thereby applying a voltage of $+V$ to the transmission line. If input port 1 is negated, point X will assume a voltage of $-V$, causing Q2 to conduct, thereby applying a voltage of $-V$ to the transmission line. The transmission requirements of information station 1 are thus satisfied.

The receiving circuits of information station 1 must respond to the magnitude of the current flowing in the transmission line and assert output port 1 if and only if said current magnitude exceeds a threshold value. By referring to FIG. 2 and assuming that Q1 and Q2 have high current gain factors, it can be seen that virtually all of the transmission line current must flow through Q1 and R2 if input port 1 is asserted and through Q2 and R3 if said port is negated. Comparators 2 and 3 and resistors R2 and R6 are arranged such that the output of comparator 2 is asserted if and only if the current in the line is greater than a positive threshold value, and the output of comparator 3 is asserted if and only if said current is less than a matching negative threshold value. Since the outputs of comparators 2 and 3 are connected to the inputs of an "OR"-gate, the output of said "OR"-gate will be asserted if and only if the line current magnitude exceeds a threshold value. The output of the "OR"-gate is conected to a low-pass filter which removes switching transients and noise from the signal. The output of the low-pass filter is connected to the schmitt trigger which produces a normalized logic signal at output port 1. This logic signal is a replica of logic input B applied to input port 2 of the second information station.

DESCRIPTION OF SECOND INFORMATION STATION EMBODIMENT

Figure 3B:
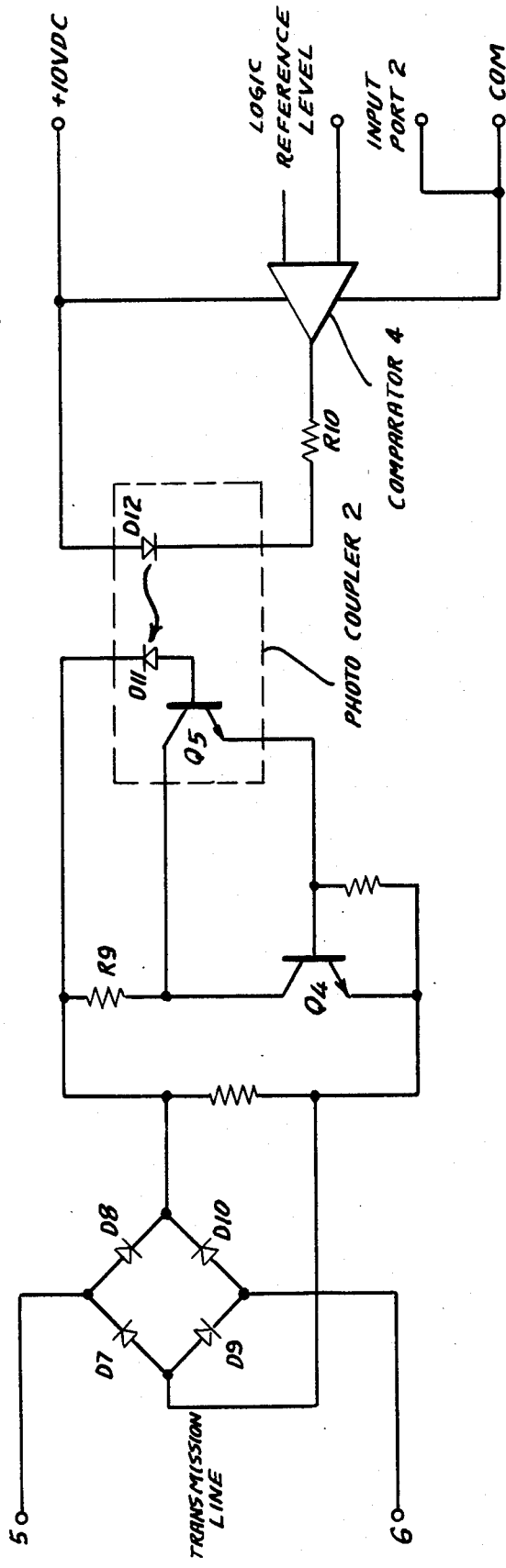
FIG. 3B illustrates one embodiment of the transmitting section of information station 2 of FIG. 1.
Figure 3A:
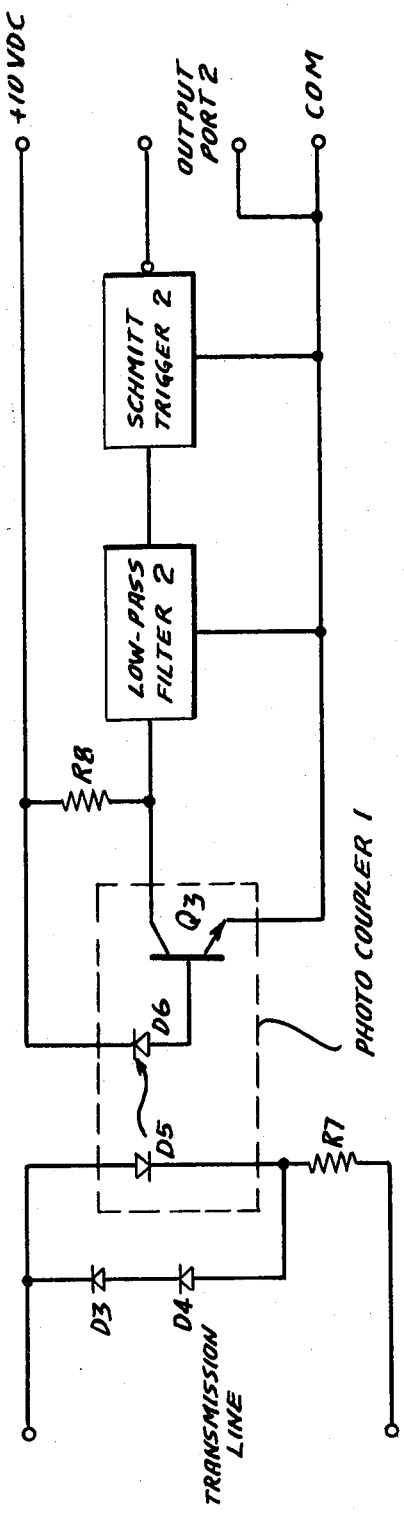
FIG. 3A illustrates one embodiment of the receiving section of information station 2 of FIG. 1.

The current embodiment of the second information station can be divided into a receiving circuit, FIG. 3A, and a transmitting circuit, FIG. 3B. The purpose of the receiving circuit is to assert output port 2 if and only if the potential at transmission line terminal 3 is positive with respect to transmission line terminal 4, while drawing a relatively small current of fixed magnitude regardless of the transmission line voltage polarity. The latter requirement is imposed by the fact that transmission line current magnitude changes must only be caused by logic signal B. Referring to FIG. 3A, it can be seen that a transmission line voltage of $+V$ causes current to flow through light emitting diode D5 and resistor R7, thereby actuating light detecting diode D6 and transistor Q3. However, a transmission line voltage of $-V$ causes current to flow through resistor R7 and diodes D3 and D4, reverse biasing D5, and leaving D6 and Q3 not actuated. The forward voltage drop of the series combination of D3 and D4 is similar to the forward voltage drop of D5, thereby causing the magnitude of current drawn by the receiving circuit from the transmission line to be constant.

Load resistor R8 causes a high or a low voltage level to be applied to the input of low-pass filter 2 if Q3 is not conducting or conducting, respectively. Low-pass filter 2 removes switching transients and noise from this signal before applying it to the input of schmitt trigger 2. Schmitt trigger 2 normalizes and logically inverts the signal at its input, before applying it to output port 2. Since output port 2 is asserted if and only if the transmission line voltage polarity is positive, the signal at said port will be a replica of logic signal A applied to input port 1 of the first information station.

The purpose of the transmitting circuit is to increase the magnitude of transmission line current from I to NI if and only if input port 2 is asserted, regardless of the polarity of the transmission line voltage. Since the receiving circuit at information station 2 draws a current of nominal magnitude I, the transmitting circuit in information station 2 must draw a current of $(N-1)I$ if input port 2 is asserted and otherwise draw no current. Referring to FIG. 3B, the current sink controlled by input port 2 consists primarily of resistor R10 and transistor Q4. If input port 2 is asserted, comparator 4 will draw current through R10, actuating light emitting diode D12. The light from D12 actuates photo sensitive diode D11. The photocurrent in D11 is amplified by transistor Q5 and applied to the base of Q4, causing Q4 to be in the conductive state. Q4 then draws current from the transmission line through R9. If transmission line terminal 5 is positive with respect to transmission line terminal 6, the current flows through diodes D8 and D9. If the transmission line voltage polarity is reversed, the current flows through diodes D7 and D10. Thus the direction of current flow through R9 does not depend on the polarity of the transmission line voltage.

If input port 2 is negated, no current flows through R10, causing D12, D11, Q5 and Q4 to be in the off state, thereby drawing no current through R9. Logic signal B applied to input port 2 thus controls the magnitude of transmission line current in the desired manner.

The above discussed embodiments of the invention provide a system for simultaneous bidirectional transmission of information signals using only a single pair of transmission wires. The embodiments discussed herein are intended to be illustrative only, and not restrictive of the scope of the invention, that scope being defined by the following claims and all equivalents thereto.

I claim:

1. A system for providing simultaneous bidirectional transmission of information between first and second information stations, said system including:
    a first information station,
    a second information station,
    a pair of transmission wires interconnecting said first and said second information stations,
    said first information station including means for providing a polarity signal in response to the logic state of a first binary signal applied thereto, said polarity signal being transmitted to said second information signal through said transmission wires,
    first electrical circuit means including a first photocoupler coupled to said transmission wires and responsive to the polarity of said polarity signal transmitted from said first to said second information station for providing an output signal at said second information station,
    said second information station including a transmitter having a second photocoupler, said transmitter being coupled to said first information station by said transmission wires for drawing a current from said first information station through said transmission wires in response to one logic state of a second binary signal applied to said transmitter and for drawing a zero current from said first information station in response to the other logic state of said second binary signal applied to said transmitter, and
    means in said first information station for detecting a current drawn therefrom,
    whereby information can be simultaneously transmitted between said first and said second information stations.

2. A system as claimed in claim 1 wherein said first electrical circuit means includes a schmitt trigger in said second information station, the input of said first photocoupler being coupled to said transmission wires to receive said polarity signal from said first information station, the output of said first photocoupler being coupled to the input of said schmitt trigger, wherein the state of operation of said first photocoupler is dependent upon the polarity of said polarity signal on said transmission wires received from said first information station, said first photocoupler driving said schmitt trigger into positive or negative saturation depending upon the polarity of said polarity signal received from said first information station.

3. A system as claimed in claim 2 wherein a positive signal received from said first information station drives said first photocoupler into conduction.

4. A system as claimed in claim 2 wherein a negative signal received from said first information station causes said first photocoupler to cut off.

5. A system as claimed in claim 1 wherein said means for detecting a current in said first information station includes at least a first comparator in said first information station for generating a first control signal in response to current flow from said first information station through said transmission wires.

6. A system as claimed in claim 5 further including a second comparator in said first information station for generating a second control signal in response to current flow from said first information station through said transmission wires, said first and second comparators being arranged such that said first control signal from said first comparator can be generated only when said polarity signal is of a first polarity, and said second control signal of said second comparator can only be generated only when said polarity signal is of a second polarity.

7. A system as claimed in claim 5 further including a schmitt trigger having its input coupled to the output of said first comparator for receiving said first control signal.

8. A system as claimed in claim 6 further including a schmitt trigger having its input coupled to the outputs of said first and second comparators for receiving said first and second control signals.

9. A system as claimed in claim 7 further including a low pass filter connecting the output of said first comparator with the input of said schmitt trigger.

10. A system as claimed in claim 8 further including a low pass filter connecting the outputs of said first and second comparators with the input of said schmitt trigger.

11. A method for simultaneously transmitting information between a first and a second information station, said method including the steps of:

providing a first information station for receiving a first binary logic signal and for generating a voltage polarity signal in response to the logic state of said first binary logic signal, providing a second information station and a receiver responsive to said polarity signal generated in said first information station for generating an output signal at said second information station, providing a pair of transmission wires for connecting said first and said second information stations through which said polarity signal is transmitted from said first to said second information station, providing a transmitter in said second information station for receiving a second binary logic signal and for drawing or not drawing a current, independent of said polarity signal, from said first information station and through said transmission wires in response to the logic state of said second binary logic signal, providing means in said first information station for detecting current drawn by said transmitter through said transmission wires and generating an output signal at said first information station in response to said current drawn by said transmitter.

12. A method as claimed in claim 11 further including the steps of:

providing a first photocoupler in said receiver for receiving said polarity signal from said first information station, and providing a second photocoupler in said transmitter responsive to the logic state of said second binary logic signal.

13. A method for simultaneously transmitting information between a first and a second information station having a pair of transmission wires disposed therebetween, said method including the steps of:

generating a voltage polarity signal at said first information station in response to the logic state of a first binary logic signal applied to said first information station, transmitting said polarity signal from said first to said second information station through said transmission wires, generating an output signal at said second information station in response to said polarity signal transmitted thereto, drawing an electrical current, independent of said polarity signal, from said first information station and through said transmission wires in response to one logic state of a second binary logic signal applied to said second information station, detecting said current drawn from said first information station as a result of said second binary logic signal applied to said second information station, and generating an output signal at said first information station in response thereto.

14. In a system for transmitting information from a first to a second information station, said system including a pair of transmission wires disposed between said first and second information stations for carrying a line voltage, the improvement comprising:

means in said first information station for varying the polarity of said line voltage in response to the logic state of a first binary signal applied to said first information station, means in said second information station responsive to the polarity of said line voltage for providing an output signal at said second information station in response to said polarity, means in said second information station for drawing a current, independent of said voltage polarity, from said first information station in response to one logic state of a second binary signal applied to said second information station, and means in said first information station for detecting said current drawn therefrom as a result of said second binary signal applied to said second information station, wherein said system provides simultaneous, bi-directional transmission of information between said first and second information stations by said first and second binary signals applied respectively thereto.

15. The system of claim 14 further including means for providing an output signal at said first information station in response to detection of current drawn therefrom as a result of said second binary signal applied to said second information station.

* * * * *